(12) United States Patent
Lundstrom

(10) Patent No.: US 7,050,251 B2
(45) Date of Patent: May 23, 2006

(54) ENCODING TECHNIQUES FOR PATTERNED MAGNETIC MEDIA

(75) Inventor: Garry R. Lundstrom, Forest Lake, MN (US)

(73) Assignee: Imation Corp., Oakdale, MN (US)

( * ) Notice: Subject to any disclaimer, the term of this patent is extended or adjusted under 35 U.S.C. 154(b) by 154 days.

(21) Appl. No.: 10/606,041

(22) Filed: Jun. 25, 2003

(65) Prior Publication Data
US 2004/0264026 A1    Dec. 30, 2004

(51) Int. Cl.
*G11B 5/09* (2006.01)
(52) U.S. Cl. ............................ 360/51; 360/48; 360/68; 360/119; 360/122; 360/55
(58) Field of Classification Search ................ 360/51, 360/73.03, 73.01, 48, 73.04, 68, 119, 122, 360/55
See application file for complete search history.

(56) References Cited

U.S. PATENT DOCUMENTS

| 5,121,280 | A | * | 6/1992 | King ........................ 360/135 |
| 5,828,510 | A | * | 10/1998 | Yada et al. .................. 360/51 |
| 5,907,448 | A | | 5/1999 | Watanabe et al. |
| 6,168,845 | B1 | | 1/2001 | Fontana, Jr. et al. |
| 6,383,597 | B1 | | 5/2002 | Fullerton et al. |
| 6,391,430 | B1 | | 5/2002 | Fullerton et al. |
| 6,421,195 | B1 | | 7/2002 | Rubin et al. |

FOREIGN PATENT DOCUMENTS

| WO | WO 99/40575 | 8/1999 |
| WO | WO 02/23538 A2 | 3/2002 |

OTHER PUBLICATIONS

Ishida et al., "Discrete-Track Magnetic Disk Using Embossed Substrate," IEICE Trans. Fundamentals, vol. E76-A, No. 7, Jul. 1993.
Takeda et al, "A Study on Pre-Embossed Rigid Magnetic Disk," IEICE Trans. Electron, vol. E77-C, No. 9, Sep. 1994.

* cited by examiner

*Primary Examiner*—David Hudspeth
*Assistant Examiner*—Natalia Figueroa
(74) *Attorney, Agent, or Firm*—Eric D. Levinson

(57) ABSTRACT

The invention is directed to patterned magnetic media for use in magnetic recording and data storage, and various encoding techniques that can be used to magnetically encode data on the patterned media. For example, a patterned magnetic recording medium can include a first set of surface variations and a second set of surface variations. The medium can be conditioned to magnetically expose the surface variations relative to areas between the respective surface variations. Detection of the surface variations in the first set can allow for synchronization of a magnetic drive to the medium. Following such synchronization, the magnetic drive can selectively apply magnetic fields to a second set of surface variations of the patterned magnetic medium to encode data on the patterned magnetic medium.

9 Claims, 10 Drawing Sheets

ENCODING TECHNIQUES FOR PATTERNED MAGNETIC MEDIA

TECHNICAL FIELD

The invention relates to data storage media and, more particularly, patterned magnetic media formed with surface variations.

BACKGROUND

Many types of magnetic data storage media have been developed to store information. They include magnetic hard drives, magnetic diskettes, magnetic tapes, magnetic tape cartridges, hybrid magnetic media such as magnetic-optical disks, and the like. Increasing data storage density is a paramount goal in the development of new or improved types of magnetic data storage media. Reducing production costs is another goal.

Magnetic media generally function according to ferromagnetic principles. For example, the surface of a magnetic medium may be coated with one or more magnetic layers, e.g., in the form of a multi-layered magnetic stack or a magnetic alloy. The local magnetization of magnetic domains defined on the magnetic layers can be selectively oriented to encode data. The local magnetizations can then be detected and interpreted in order to read the recorded data. A hysteresis curve typically defines how the magnetic domains can be oriented or reoriented in response to application and removal of magnetic fields.

A number of techniques have been developed to increase storage densities and improve quality and reliability of magnetic media. For example, new and improved coatings have been developed in an effort to improve quality and performance of magnetic media. In addition, patterned media have been developed, in which microscopic surface variations in the form of bumps, pits, ridges, grooves, or the like, are added to the media. The surface variations may be magnetically encoded, e.g., for the purpose of information storage, or to provide servo patterns that can be used to identify locations on the media with improved accuracy. In both cases, the addition of surface variations may increase storage densities.

Magnetic media can also be categorized as longitudinal or perpendicular. Most conventional magnetic media are longitudinal. In longitudinal media, magnetic anisotropy lies parallel to the plane of the medium. In other words, in longitudinal media, the magnetic orientation of individual magnetic domains is generally parallel to the surface of the medium.

In perpendicular media, on the other hand, magnetic anisotropy is perpendicular to the plane of the medium. In other words, in perpendicular media, the magnetic orientation of individual magnetic domains is perpendicular to the medium surface. Perpendicular media generally allow for higher storage densities than can be achieved in longitudinal media.

SUMMARY

In general, the invention is directed to patterned magnetic media for use in magnetic recording and data storage, and various encoding techniques that can be used to magnetically encode data on the patterned media. For example, a patterned magnetic recording medium can include a first set of surface variations and a second set of surface variations. The medium can be conditioned to magnetically expose the surface variations relative to areas between the respective surface variations. Detection of the surface variations in the first set can allow for synchronization of a magnetic drive to the medium. Following such synchronization, the magnetic drive can selectively apply magnetic fields to a second set of surface variations of the patterned magnetic medium to encode data on the patterned magnetic medium.

The surface variations may comprise bumps, pits, ridges, rails, channels, grooves, or other types of protrusions or depressions. The techniques described herein may be especially useful for perpendicular patterned media, i.e., media having patterns formed on the media surface and having a magnetic anisotropy that is perpendicular to the plane of the medium. In particular, perpendicular magnetic anisotropy permits effective conditioning and selective encoding of surface variations that are less than approximately 5.0 microns in width. Once conditioned, the surface variations can be magnetically detected and synchronization can be achieved based on detection of a first set of surface variations. Following synchronization, selective magnetic encoding of surface variations in a second set can be achieved in order to magnetically encode data on the surface variations.

In one embodiment, the invention provides a method comprising synchronizing a magnetic drive to a patterned magnetic medium based on detection of a set of first surface variations in the patterned magnetic medium, and selectively applying magnetic fields to a second set of surface variations of the patterned magnetic medium to encode data on the patterned magnetic medium. The timing of the selective application of the magnetic fields is defined by the synchronization of the magnetic drive to the patterned magnetic medium.

In another embodiment, the invention provides a patterned magnetic recording medium comprising a substrate and a magnetic recording layer formed over the substrate. The magnetic recording layer includes a first set of surface variations and a second set of surface variations, wherein the first set of surface variations define a synchronization pattern used by a drive to define timing of selective application of magnetic fields to the second set of surface variations, and the second set of surface variations define a pattern arranged for storage of magnetically encoded data.

In another embodiment, the invention provides a system comprising a patterned magnetic recording medium including a substrate, and a magnetic recording layer formed over the substrate, the magnetic recording layer including a first set of surface variations and a second set of surface variations. The system also includes a magnetic drive that synchronizes to the patterned magnetic medium based on detection of the set of first surface variations, and selectively applies magnetic fields to the second set of surface variations to encode data on the patterned magnetic medium, wherein a timing of the selective application of the magnetic fields is defined by the synchronization of the magnetic drive to the patterned magnetic medium.

The invention may be capable of providing one or more advantages. For example, perpendicular patterned magnetic media according to the invention may achieve higher storage densities than patterned longitudinal media. The use of a magnetic recording layer exhibiting perpendicular magnetic anisotropy enables effective conditioning and selective encoding to occur, as described herein, specifically when the widths of surface variations are less than approximately 5.0 microns, and more specifically less than approximately 1.0 micron. At these sizes, the conditioning and encoding techniques may be less effective, or possibly ineffective, when longitudinal recording layers are used. Accordingly, the use of a recording layer exhibiting perpendicular magnetic anisotropy is a useful feature to facilitate conditioning and encoding, as described herein, specifically when the media has surface variations of widths less than approximately 5.0 microns, and more specifically less than approximately 1.0 micron. In addition, the encoding techniques described herein can allow for high resolution write gaps less than 50% of the width of the surface variations to be used.

Additional details of these and other embodiments are set forth in the accompanying drawings and the description below. Other features, objects and advantages will become apparent from the description and drawings, and from the claims.

DETAILED DESCRIPTION

The invention is directed to patterned magnetic media for use in magnetic recording and data storage, and various encoding techniques that can be used to magnetically encode data on the patterned media. For example, a patterned magnetic recording medium can include a first set of surface variations and a second set of surface variations. The medium can be conditioned to magnetically expose the surface variations relative to areas between the respective surface variations. Detection of the surface variations in the first set can allow for synchronization of a magnetic drive to the medium. Following such synchronization, the magnetic drive can selectively apply magnetic fields to a second set of surface variations of the patterned magnetic medium in order to encode data on the patterned magnetic medium. In other words, synchronization refers to the process by which the magnetic drive uses detection of the surface variations in the first set to determine or predict when it will pass over or otherwise encounter the surface variations in the second set.

The surface variations may comprise bumps, pits, ridges, rails, channels, grooves, or other types of protrusions or depressions. The techniques described herein may be especially useful for perpendicular patterned media, i.e., media having patterns formed on the media surface and having a magnetic anisotropy that is perpendicular to the plane of the medium. In particular, perpendicular magnetic anisotropy permits effective conditioning and selective encoding of surface variations that are less than approximately 5.0 microns in width, and in some cases less than 1.0 micron in width.

The phrase "perpendicular magnetic media" refers to magnetic media in which magnetic anisotropy is perpendicular to the surface of the medium. In contrast, the phrase "longitudinal magnetic media" refers to magnetic media in which magnetic anisotropy is generally parallel to the surface of the medium. Perpendicular media allows for much higher storage densities than can be achieved in longitudinal media. In accordance with the invention, a patterned, perpendicular magnetic medium is described that is conditioned for magnetic detection of surface variations. Once conditioned, the surface variations can be magnetically detected for synchronization based on a first set of surface variations. Synchronization, in turn, allows for selective encoding of surface variations in a second set.

Figure 1:
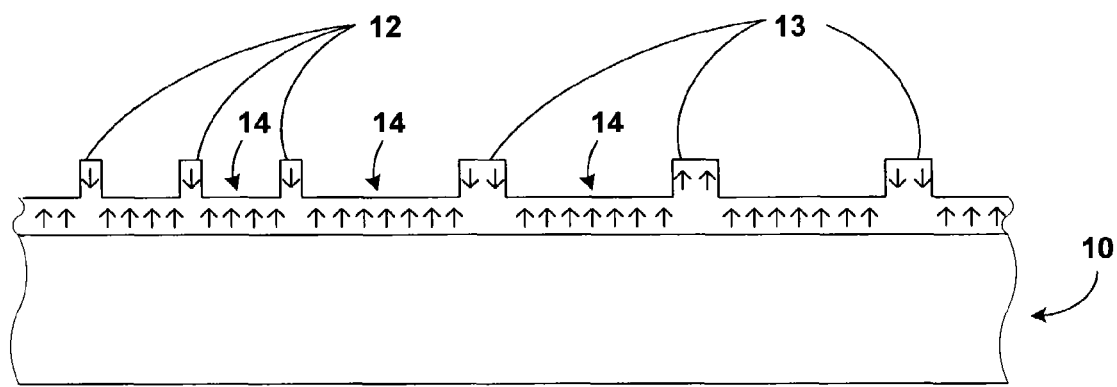
FIGS. 1–4 are enlarged cross-sectional side views of an exemplary magnetic recording media according to embodiments of the invention.

FIG. 1 is a conceptual side view of an exemplary magnetic recording medium 10. Medium 10 may correspond to a magnetic disk, magnetic tape, a card-shaped medium, or other media types. In any case, medium 10 is formed with a first set of surface variations 12 and a second set of surface variations 13.

In the example of FIG. 1, surface variations 12, 13 comprise bumps that protrude a small distance from the surface of medium 10. In other embodiments, however, the patterns of surface variations 12, 13 may comprise pits, ridges, rails, channels, grooves, or other types of protrusions or depressions that protrude from, or extend into the surface of medium 10. Various combinations of surface variations can also be used.

The first set of surface variations 12 may comprise features used for servo tracking or synchronization purposes, whereas the second set of surface variations 13 may comprise features used for magnetic data storage. For example, surface variations 12, 13 may be embossed, etched, molded, ablated, or the like, e.g., on a polymer material that forms an underlayer of medium 10, or possibly on the substrate of medium 10. Surface variations 12, 13 generally provide a microscopic roughness or texture to the surface of medium 10. The different surface variations may have similar shapes to one another, or may assume different shapes. For example, surface variations 12 may be larger, smaller, or the same size as surface variations 13.

As mentioned, surface variations 12 in the first set may contain patterns for tracking and synchronization purposes, and surface variations 13 in the second set may comprise features used for magnetic data storage. In other words, surface variations 13 in the second set can be arranged to facilitate data storage, e.g., arranged in a periodic manner.

In accordance with the invention, surface variations 12, 13 can be magnetically exposed relative to areas 14 between the respective surface variations. As a result, surface variations 12, 13 carry magnetizations that enable a magnetic read head to distinguish them from areas 14. Then, a drive can detect surface variations 12 in the first set and synchronize to medium 10 based on detection of the first set of surface variations 12. Following synchronization, the drive can selectively apply positive or negative magnetic fields on surface variations 13 in the second set in order to encode data on surface variations 13, e.g., by selectively applying magnetic fields to surface variations 13 at times determined by the synchronization. In that case, synchronization ensures that application of magnetic fields to record data is avoided in the areas 14 specifically between surface variations 13 in the second set. Synchronization can account for both the spacing between the surface variations 13 in the second set, and also the speed of the medium relative to a magnetic head.

Mechanically formed surface variations 12, 13 may be sized smaller than conventional written magnetic transitions, and thus may provide the ability to achieve higher storage densities on medium 10 than can be achieved with conventional magnetic media that does not include surface variations. For example, in some cases, individual surface variations may have at least one lateral dimension less than one micron. If surface variations are depressions, such as pits or grooves, the variations may be approximately 20 nm to 150 nm deep. If surface variations 12, 13 project from medium 10, they may project to a height less than a fly height (in the case of flyable media), ensuring that medium 10 maintains a flyable surface by avoiding head-to-medium collisions.

In one specific embodiment, surface variations 12, 13 include a plurality of oval shaped bumps, some having a surface area less than approximately 40,000 square nanometers. Again, these bumps may project from medium 10 to a height less than the fly height, e.g., in the case of flyable media. For instance, a medium designed to fly at a height of approximately 25 nm may have bumps that project from the medium to a height less than approximately 20 nm. Bumps of this size may allow significant areal density of read-only data (>1 Gigabit/cm$^2$) while still ensuring that the medium maintains a flyable surface for a read head.

As outlined in greater detail below, surface variations 12, 13 of medium 10 can be magnetized different from areas 14 of medium 10 in order to magnetically expose the surface variations 12, 13. Then, detection of surface variations 12 in the first set can synchronize a drive so that surface variations 13 in the second set can be selectively magnetized in order to encode data in surface variations 13 in the second set.

Magnetic conditioning can improve the detectability of surface variations, e.g., allowing a magnetic head to magnetically detect the presence or absence of individual surface variations with greater ease. Accordingly, synchronization information can be encoded in medium 10 by the creation and conditioning of surface variations 12 in the first set. Following the conditioning, detection of surface variations 12 in the first set can synchronize a drive so that surface variations 13 in the second set can be selectively magnetized in order to encode data. In other words the pattern defined by the first set of surface variations 12 provides information to the drive regarding the layout and spacing of surface variations 13 in the second set. In accordance with the invention, encoding of surface variations 13 in the second set may be performed with a magnetic head defining a write gap less than approximately 50% of the width of surface variations 13 in the second set.

Figure 2:
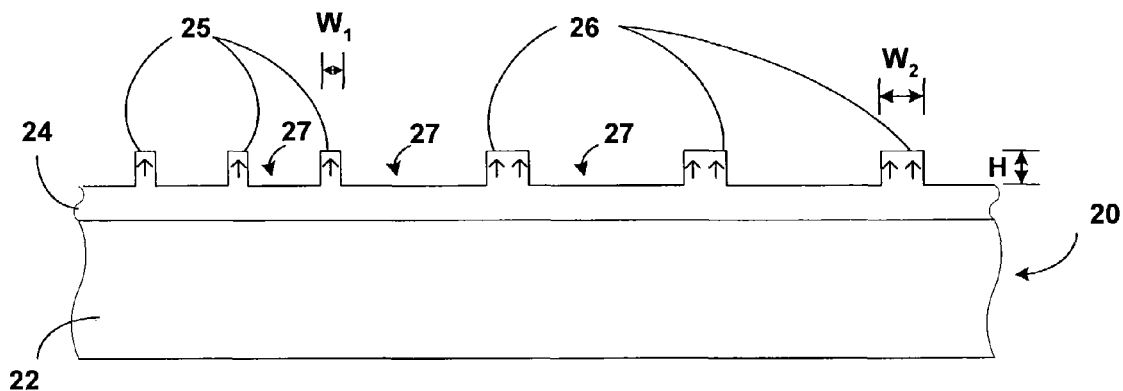

FIG. 2 is a conceptual enlarged cross-sectional side view of an exemplary magnetic recording medium 20 according to an embodiment of the invention. As shown, magnetic recording medium 20 includes a substrate 22, and a magnetic recording layer 24 formed over substrate 22. Additional layers may optionally be added between substrate 20 and a magnetic recording layer 24 such as seed layers to facilitate growth of recording layer 24 or a polymer layer used to define surface variations 25, 26 in recording layer 24. Also, additional layers may be added over magnetic recording layer 24, such as a lubrication layer or hard coat. In any case, magnetic recording layer 24 exhibits different sets of surface variations 25, 26. The first set of surface variations 25 provides a clocking mechanism on medium 20 so that synchronization can be achieved by a drive for selective magnetic encoding of the second set 26 of surface variations.

Substrate 22 may comprise glass, plastic, organic resin, metal, or any other suitable substrate material. Plastic is a particularly attractive substrate material because of its low cost and ease of production. Moreover, plastic substrates may be molded with surface variations, e.g., during an injection molding process.

In general, magnetic recording layer 24 comprises a substantially continuous layer that includes at least one ferromagnetic material to facilitate magnetic recording. In some cases, magnetic recording layer 24 comprises a magnetic alloy formed of a number of materials. In other cases, magnetic recording layer 24 may include a number of sub-layers, e.g., arranged as a multi-layered magnetic stack. Magnetic recording layer 24 is typically formed by a deposition process in which the material or materials of recording layer 24 are sputtered onto substrate 22, or sputtered onto one or more other layers formed over substrate 22 prior to the deposition of recording layer 24. Alternatively, a wet coating technique may be used. Magnetic recording layer 24 may be a substantially continuous layer that does not include areas having the recording material selectively removed.

Magnetic recording layer 24 can comprise a perpendicular recording layer in which the magnetic anisotropy of layer 24 is perpendicular to the plane of medium 10B, although the invention is not necessarily limited in that respect. In a perpendicular medium, the magnetic orientation of individual magnetic domains is perpendicular to the medium surface. Perpendicular media generally allow for a much higher storage density than can be achieved in longitudinal media. Copending and commonly assigned U.S. application Ser. No. 10/123,957, filed Apr. 17, 2002 for Sexton, bearing docket number 10326US01 and entitled "Perpendicular Magnetic Recording Media," and U.S. application Ser. No. 10/146,269, filed May 15, 2002 for Sexton bearing docket number 10334US01 and entitled "Perpendicular Magnetic Recording Media With An Amorphous Underlayer" describe some exemplary perpendicular recording layers that may be used in accordance with this invention, and are hereby incorporated by reference in their entireties. Other magnetic recording materials or perpendicular magnetic recording layers, however, may also be used such as layers including CoCrPt alloys or CoCr alloys.

As outlined in greater detail below, a conditioning process is applied so that surface variations 25, 26 are magnetized different from the areas 27 between the respective surface variations 25, 26. For example, a DC magnetic field selected to have the appropriate field strength can be used to magnetize surface variations 25, 26 substantially the same (as indicated by the similar perpendicular orientation of the arrows) without substantially affecting the magnetization of non-patterned areas 27 between the different surface variations 25, 26. Once the perpendicular domains of surface variations 25, 26 are magnetized substantially the same, albeit different from non-patterned areas 27 between the different surface variations 25, 26, a conventional longitudinal read head can be used to detect individual surface variations. Moreover, detection of the first set of surface variations 25 can synchronize the drive so that selective encoding of the second set of surface variations 26 can be performed. In this manner, the ability to magnetically encode the second set of surface variations 26 can be improved.

In accordance with the invention, at least some of surface variations 25, 26 may have a width ($W_1$ or $W_2$) less than approximately 5.0 microns, and more preferably, less than approximately 1.0 micron. In that case, the height (H) of surface variations 25, 26 (or depth if depressions are used rather than protrusions) may be in the range of 5–100 nm, and more preferably approximately 20–50 nanometers. In particular, it has been determined that the use of a magnetic recording layer 24 exhibiting perpendicular magnetic anisotropy enables effective conditioning to occur, as described herein, specifically when the widths W of surface variations are less than approximately 5.0 microns, and more specifically less than approximately 1.0 micron. The perpendicular nature of magnetic recording layer 24 may also improve the ability to selectively encode surface variations 26 in the second set, as described herein.

Surface variations 25 in the first set may be distinguishable from surface variations 26 in the second set, although the invention is not necessarily limited in that respect. In the illustrated example widths $W_1$ and $W_2$ are different. If desired, the shapes and/or heights of surface variations 25 can also be made different from surface variations 26. Surface variations 25 in the first set provide a synchronization mechanism such that readout of surface variations 25 allows a drive to synchronize to medium 20 and thereby facilitate selective magnetic encoding of surface variations 26 in the second set.

Figure 3:
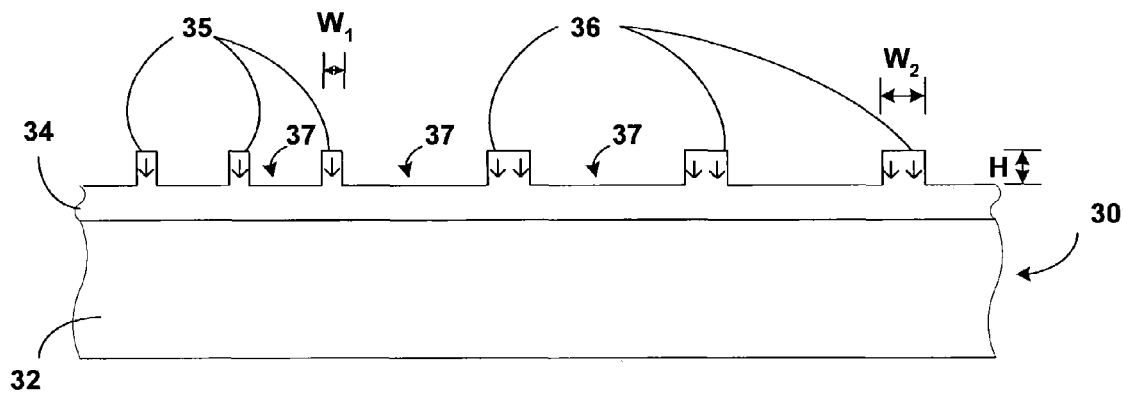

FIG. 3 illustrates a slight variation of the magnetic medium of FIG. 2. As shown in FIG. 3, medium 30 includes magnetic recording layer 34. In magnetic recording layer 34, first and second sets of surface variations 35, 36 are magnetized substantially the same, albeit different from non-patterned areas 37 between the respective surface variations. Again, a conditioning technique can be used to achieve such magnetization as described herein. However, the polarization of the magnetization of surface variations 35, 36 is reversed relative to surface variations 25, 26 illustrated in FIG. 2. One advantage of the conditioning techniques described herein is the ability to easily perform such a polarization reversal as described in greater detail below.

Again, at least some of surface variations 35, 36 may have a width ($W_1$ or $W_2$) less than approximately 5.0 microns, and more preferably, less than approximately 1.0 micron, and a height (H) or depth in the range of approximately 5–100 nm. Heights or depths larger than a fly height may cause risk of head crashes, while depths or heights that are too small may cause difficulty in conditioning because of inadequate head to medium spatial differences at surface variations relative to non-patterned areas.

Figure 4:
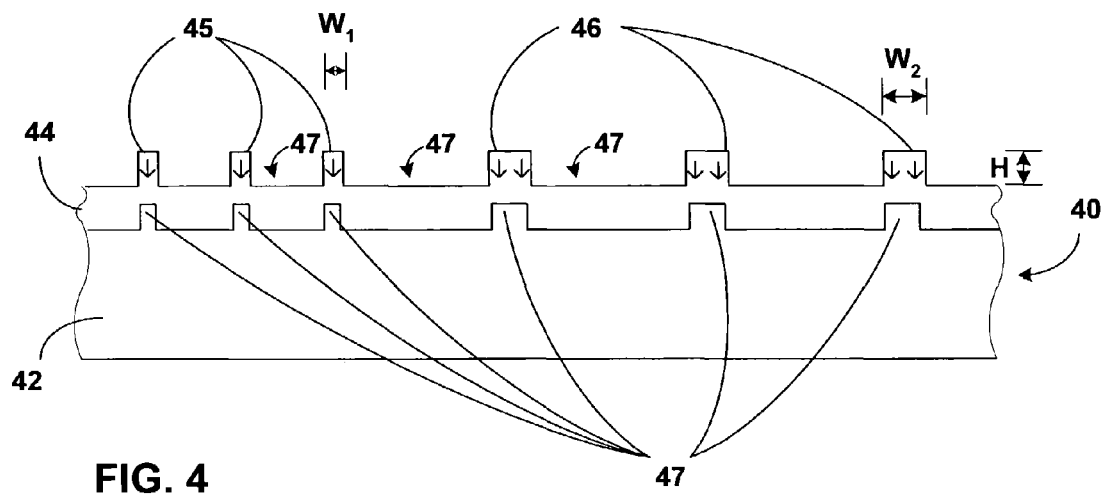

FIG. 4 is a conceptual enlarged cross-sectional side view of an exemplary magnetic recording medium 40 illustrating one exemplary method for forming surface variations 45, 46. In this case, surface variations 45, 46 are formed by replicating features 47 into substrate 42. For example, features 47 may be defined during a mastering and stamping process in which a stamper is created from a master and then used in an injection molding process to injection mold substrate 42 to exhibit features 47. Alternatively, features 47 may be etched, embossed, ablated, or the like, into substrate 42 after the substrate is molded. In any case, a substantially continuous magnetic recording layer 44 can be deposited over substrate such that recording layer 44 substantially conforms to features 47. In this manner, surface variations 45, 46 can be defined by features 47 formed in substrate 40. Moreover, at least some of surface variations 45, 46 may have a width ($W_1$ or $W_2$) less than approximately 5.0 microns, and more preferably, less than approximately 1.0 micron, and a height (H) or depth in the range of approximately 5–100 nm.

Alternatively, an additional layer, such as a polymer layer, may be added over a substantially flat substrate prior to the deposition of the recording layer. In that case, the additional layer may be replicated, ablated, embossed, or the like, to form features similar to features 47 (FIG. 4). In still other cases, surface variations may be formed directly in a substantially continuous recording layer, such as via a calendaring process using an embossing calendar drum that replicates such features directly into the recording material. In short, the invention is generally not limited to the methods or manner in which surface variations are formed in the recording layer. Rather, a wide variety of techniques may be used to define the surface variations, including replication, embossing, ablation, calendaring, or the like.

Figure 5:
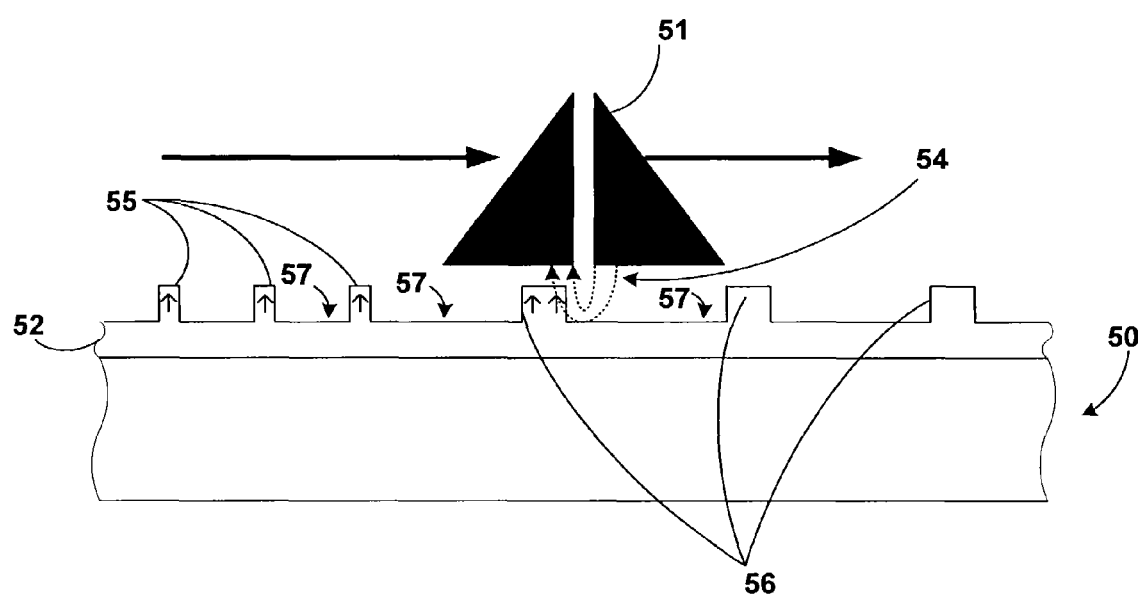
FIGS. 5–7 are cross-sectional views of an exemplary data storage media being conditioned by a magnetic head in accordance with an embodiment of the invention.

FIG. 5 is a conceptual cross-sectional view of exemplary data storage medium 50 being conditioned by a magnetic head 51 in accordance with an embodiment of the invention. Magnetic head 51 may form part of a magnetic drive, such as a tape drive or disk drive. As shown, head 51 passes over medium 50, applying a DC magnetic field 54 to the surface of medium 50. In other words, an electrical direct current (DC) is applied to head 51 causing the head to produce a non-oscillating field 54. In particular, the strength of DC magnetic field 54 is strong enough to magnetize surface variations 55, 56 but too weak to substantially magnetize the non-patterned areas 57 between the different surface variations 55, 56. The conditioning pass of head 51 (as illustrated by the lateral arrows) conditions surface variations 55, 56 such that surface variations 55, 56 are magnetized substantially the same, and different from the non-patterned areas 57. The same concept, however, may be applied to surface variations in the form of pits in which the DC magnetic field is strong enough to magnetize non-patterned areas, but too weak to magnetize the pits.

In accordance with the invention, magnetic recording layer 52 may exhibit perpendicular magnetic anisotropy. Moreover, head 51 may comprise a conventional longitudinal or perpendicular read/write head. While conventional longitudinal read/write heads may be less effective in conditioning patterned longitudinal media having feature sizes less than approximately 5 microns, surprisingly, they are very effective in conditioning such media exhibiting perpendicular magnetic anisotropy. In particular, head 51 can be used to apply an appropriately selected DC magnetic field sufficient to magnetize surface variations 55, 56 but insufficient to magnetize non-patterned areas 57 (or vice versa). Selective magnetization of the surface variations versus non-patterned areas may occur because of the different magnetic flux intensities associated with the slight changes in head-to-medium spacing caused by the existence or absence of a surface variation directly below head 51 at any given instance.

The DC magnetic field needed to selectively magnetize surface variations 55, 56 may depend on the composition of recording layer 52, as well as the distance from head 51 to medium 50. In one example, effective conditioning occurs by applying approximately a 15 mA current (or −15 mA current) to head 51 and passing head 51 over medium 50 at a head-to-medium spacing of less than approximately 25 nanometers. In that case, the head 51 may move over medium 50 at a speed in a range of 1800–15000 revolutions per minute (RPM), and more particularly a speed of approximately 3600 RPM or greater.

Figure 6:
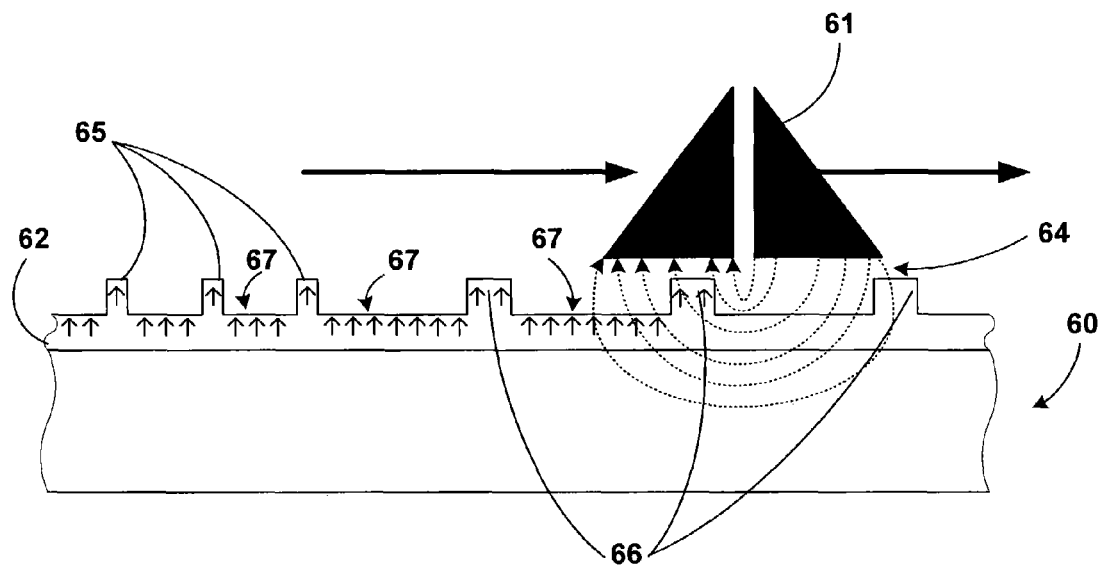
Figure 7:
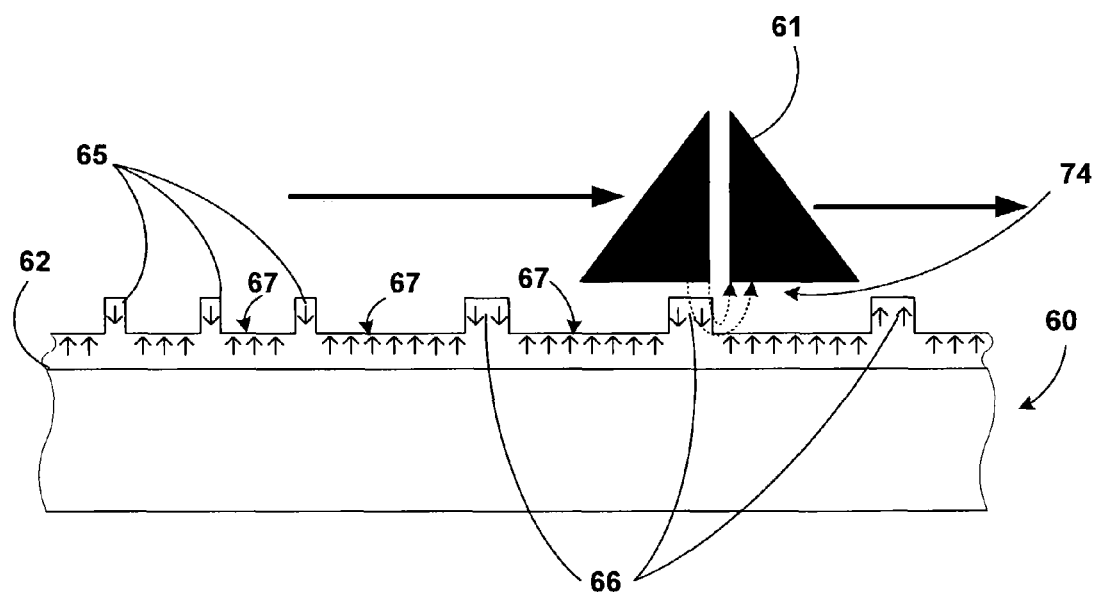

FIGS. 6 and 7 are additional conceptual cross-sectional views of exemplary data storage medium 60 being conditioned by a magnetic head 61 in accordance with an embodiment of the invention. In this example, head 61 makes at least two passes over medium 60, applying a relatively strong DC magnetic field 64 to the surface of medium 60 to polarize both the surface variations and non-patterned areas of recording layer 62, and then applying a weaker DC magnetic field 74 that is strong enough to magnetize surface variations to an opposite polarity, but too weak to magnetize non-patterned areas to that opposite polarity. Again, the same concept may be applied to surface variations in the form of pits in which the weak DC magnetic field 74 is strong enough to magnetize non-patterned areas, but too weak to magnetize surface variations.

The first pass of head 61 (illustrated in FIG. 6) can be viewed as an erase pass that erases all selective magnetizations and orients the perpendicular domains of layer 62 in a common orientation. The second pass of head 61 (illustrated in FIG. 7) can be viewed as a write pass that magnetizes only surface variations 65, 66 (or only the non-patterned areas if pits are used rather than bumps as illustrated). In either case, the first pass commonly orients layer 62, and the second pass magnetically distinguishes surface variations 65, 66 of layer 62 from non-patterned areas 67.

Like the example of FIG. 5, in the example of FIGS. 6 and 7, the applied DC magnetic fields can be selected for proper conditioning to occur. For example, during the erase pass illustrated in FIG. 6, field 64 may be created by applying approximately a 50 mA current (or −50 mA current) to head 61 and passing head 61 over medium 60 at a head-to-medium spacing of approximately less than approximately 25 nanometers, and a head speed of approximately 3600 RPM. During the write pass illustrated in FIG. 7, field 74 may be created by applying approximately a −15 mA current (or 15 mA current) to head 61 and passing head 61 over medium 60 at a head-to-medium spacing of less than approximately 25 nanometers and a head speed of approximately 3600 RPM.

Importantly, if the erase pass (FIG. 6) uses a positive current, then the write pass (FIG. 7) should use a negative current. Likewise, if the erase pass (FIG. 6) uses a negative current, then the write pass (FIG. 7) should use a positive current. In either case, the use of an erase pass, followed by a write pass, may improve performance of medium 60 in terms of the read-back signal strength and ability to detect the magnetically enabled surface variations 65, 66.

Alternatively, a bulk erase process could also be used instead of an erase pass. In other words, the same effect of the erase pass may be achieved by subjecting the medium to a large magnetic field that commonly orients all the magnetic domains of the medium.

Figure 8:
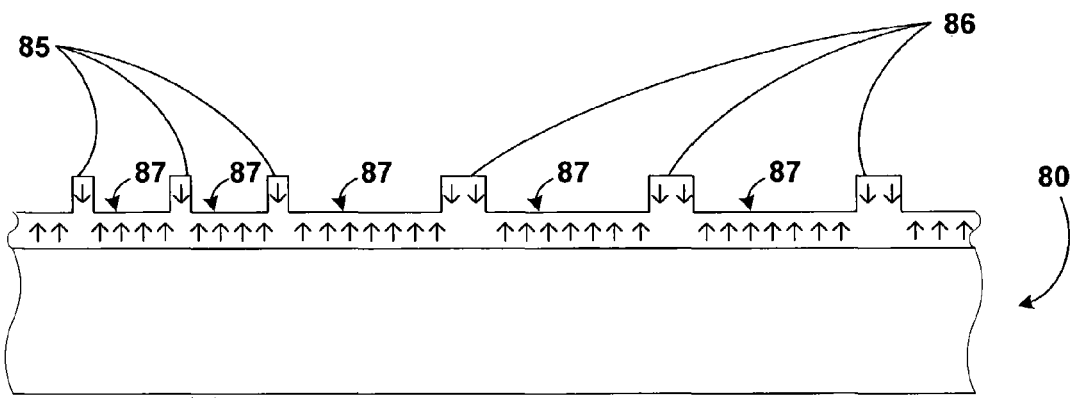
FIG. 8 is another enlarged cross-sectional side view of an exemplary magnetic recording medium according to an embodiment of the invention.

FIG. 8 is another conceptual enlarged cross-sectional side views of an exemplary magnetic recording medium 80 according to an embodiment of the invention. In particular, FIG. 8 illustrates medium 80 after conditioning, such as illustrated in FIG. 5, FIGS. 6 and 7, or the like. Medium 80 includes a first set of surface variations 85 and a second set of surface variations 86. Following conditioning, the surface variations 85, 86 are magnetized substantially the same as one another, and different from non-patterned areas 87 between the different surface variations 85, 86. In this manner, conditioning magnetically exposes surface variations 85, 86 relative to areas 87 between the respective surface variations.

In accordance with the invention, surface variations 85 in the first set are arranged as a clocking mechanism on medium 80 that can be used to synchronize a drive to medium 80. In other words, surface variations 85 in the first set generate a readout signal that can be used to synchronize a drive to medium 80. Then, magnetic fields can be selectively applied to surface variations 86 in the second set in order to encode data in surface variations 86. In other words, synchronization refers to the process by which the magnetic drive uses detection of the surface variations in the first set to determine or predict when it will pass over or otherwise encounter the surface variations in the second set.

Figure 9:
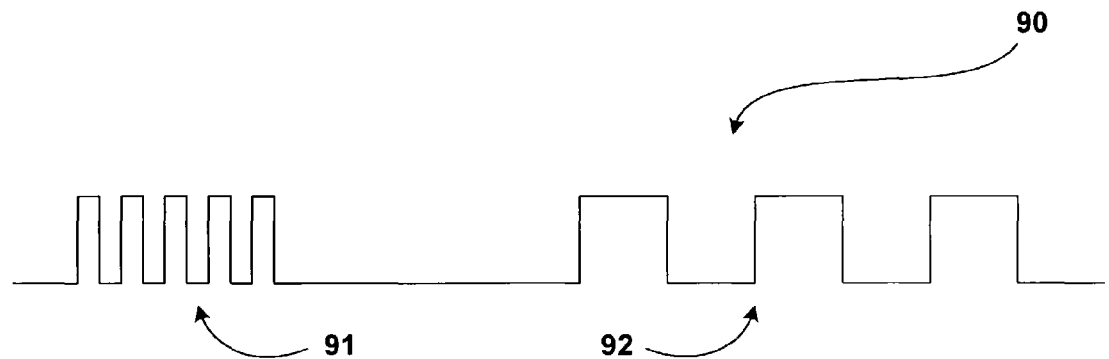
FIGS. 9 and 10 are timing diagrams illustrating exemplary signals that can be encoded on a patterned magnetic medium in accordance with embodiments of the invention.

FIG. 9 is a simplified readout signal 90 associated with magnetic detection of surface variations 85, 86 of medium 80. A clock signal 91 is generated by readout of surface variations 85 in the first set. The magnetic drive can be synchronized to clock signal 91, such that selective magnetic encoding of surface variations 86 in the second set can be performed by the drive, e.g., at times associated with signal 92 which comprises a readout signal of surface variations 86 prior to selective magnetic encoding. Put another way, detection of clock signal 91 associated with surface variations 85 in the first set, allows a drive to synchronize to medium 80 and facilitate selective encoding at times that enable the magnetic encoding of data in surface variations 86 in the second set.

Figure 10:
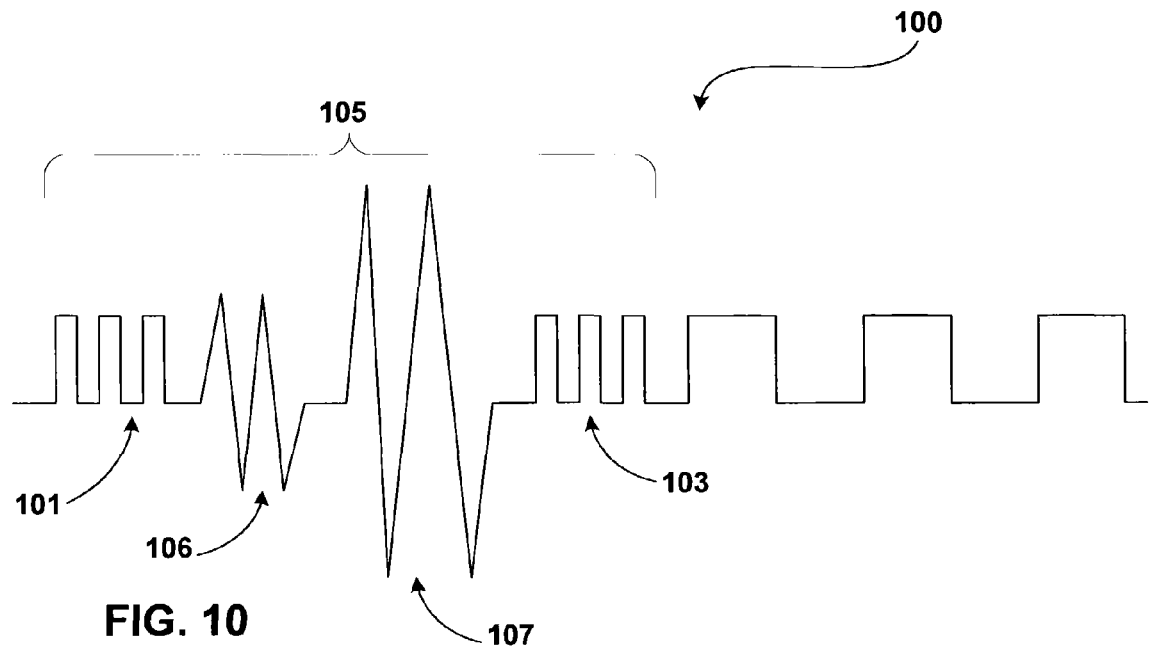

Clock signal 91 may form part of a variable frequency oscillator (VFO) signal encoded in the layout and arrangement of the first set of surface variations 85. FIG. 10 illustrates another simplified readout signal 100 that may be associated with magnetic detection of surface variations 85, 86 of medium 80. Readout signal 100 comprises a servo wedge 105 encoded in the layout of surface variations 85 in the first set. Readout signal 100 includes a number of identification features, including VFO clock signals 101 and 103 at the beginning and end of servo wedge 105. In addition, readout signal 100 may include a sector identification signal 106, a track identification field 107, and possibly one or more servo signals.

In accordance with the invention, a magnetic drive detects VFO clock signals 101 and 103 encoded in the first set of surface variations 85, and uses VFO clock signals 101 and 103 to synchronize itself to medium 80. Then, the drive can magnetically encode data in the second set of surface variations 86 by selectively applying positive or negative magnetic fields to the individual surface variations 86 in the second set. In other words, detection of clock signals 101 and 103 allows a drive to know the timing when such fields can be selectively applied to surface variations 86 in the second set.

First sets of surface variations 85 may be included at a number of locations along the surface of medium 80. For example, if medium 80 comprises a disk-shaped medium, a first set of surface variations 85 may be included for each sector of the disk-shaped medium. In that case, a drive can periodically resynchronize to medium 80 at each sector. Alternatively, if medium 80 comprises a magnetic tape, a first set of surface variations 85 may be included periodically along the length of the tape. In that case, a drive can periodically re-synchronize; to medium 80 each time another first set of surface variations 85 is encountered.

Figure 11:
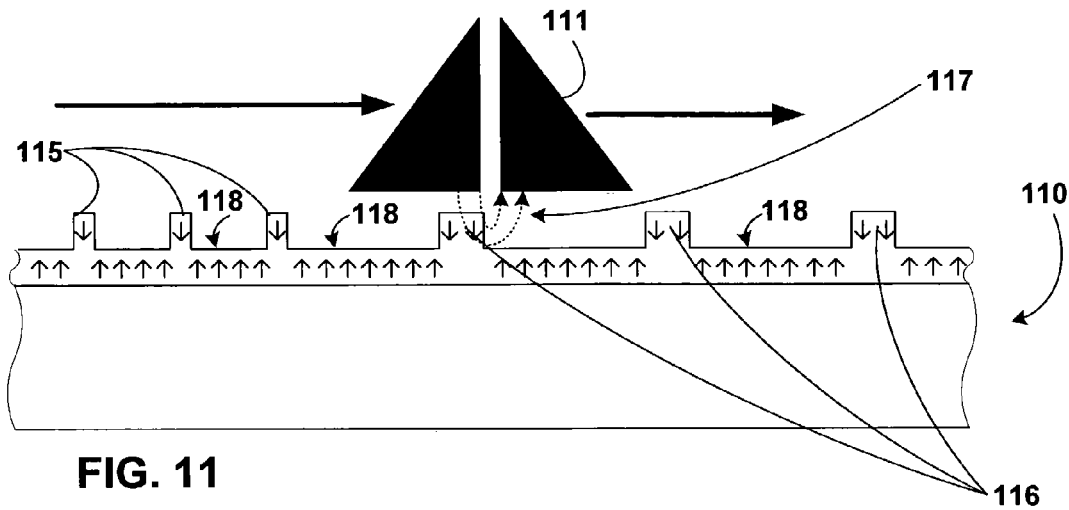
FIGS. 11–13 are cross-sectional views of an exemplary data storage medium being selectively encoded by a magnetic head in accordance with an embodiment of the invention.
Figure 12:
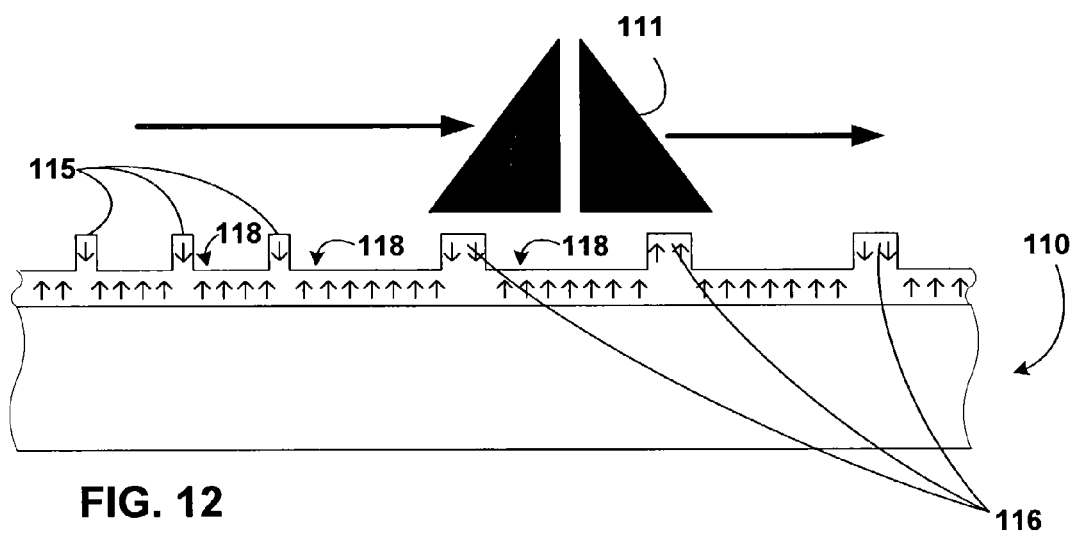
Figure 13:
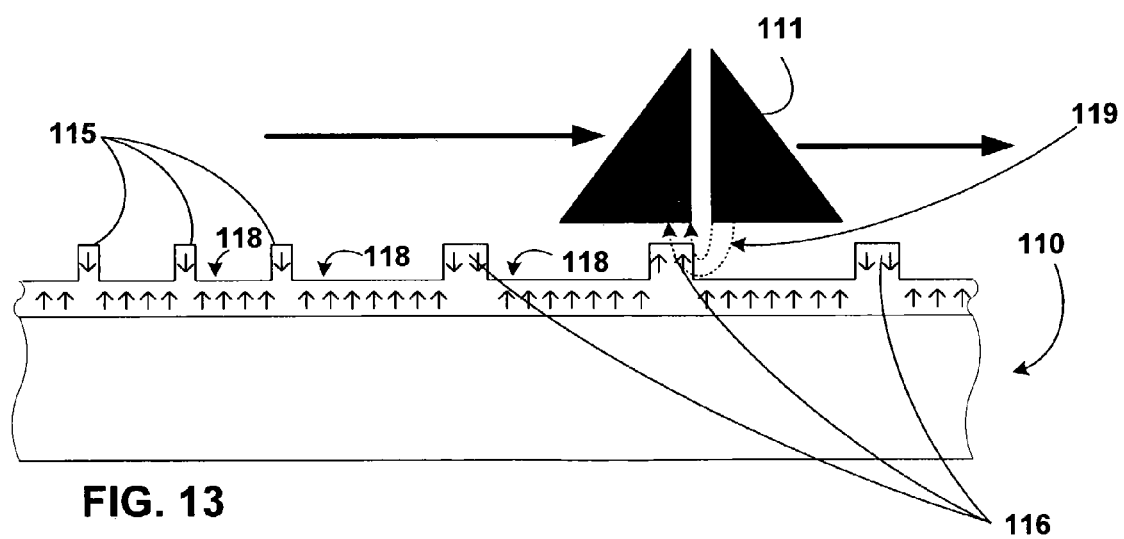

FIG. 11–13 are conceptual cross-sectional views of exemplary data storage medium 110 being selectively encoded by a magnetic head 111 in accordance with an embodiment of the invention. Following detection of a first set of surface variations 115, the drive associated with magnetic head 111 is synchronized to medium 110. Accordingly, the drive associated with magnetic head 111 knows the times when head 111 will pass over surface variations 116 in the second set. In accordance with the invention, magnetic head 111 can apply a positive or negative magnetic field 117 specifically at times when it passes over one of surface variations 116 in the second set, as shown in FIG. 11. When magnetic head 111 passes over non-patterned areas 118 between surface variations 116, no field is applied as shown in FIG. 12. Then, when magnetic head 111 passes over another of surface variations 116 in the second set, as shown in FIG. 13, another selective magnetic field 119 can be applied. Fields 117 and 119 may have opposite magnetic polarity, consistent with selective encoding of surface variations 116. The encoding of differing polarity of various surface variations can be exploited for information storage.

Figure 14:
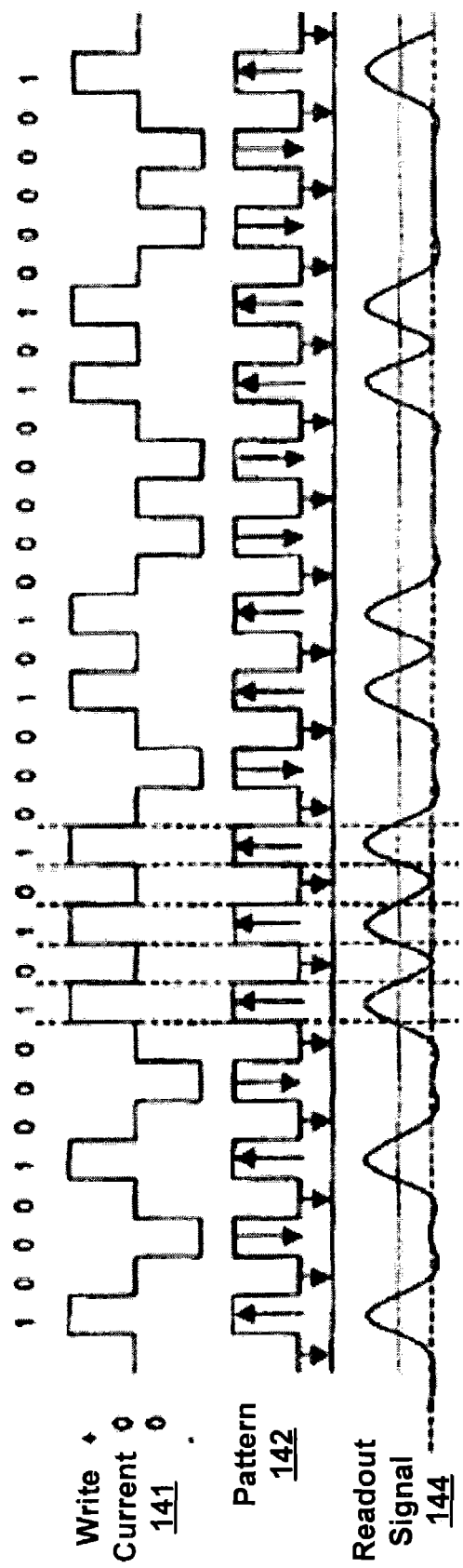
FIG. 14 is an exemplary timing diagram illustrating selective encoding of surface variations based on timing defined by a clock signal in accordance with an embodiment of the invention.

FIG. 14 is a timing diagram illustrating selective encoding of a second set of surface variations following synchronization based on detection of a first set of surface variations. Again, synchronization based on detection of a first set of surface variations allows the drive to know when to apply selective magnetic fields in order to selectively encode individual surface variations in the second set. Write current 141 is provided to a magnetic head as shown in FIG. 14. In particular, write current is a positive or negative current specifically applied at times when the head passes over the individual surface variations of pattern 142 in order to selectively orient the perpendicular domains. However, write current 141 always returns to an approximately zero value at times when the head passes between the individual surface variations of pattern 142. Pattern 142 generally corresponds to a second set of surface variations as described in this disclosure. For example, pattern 142 may comprise a substantially periodic collection of surface variations arranged on the surface of the medium for storage of magnetically encoded data.

FIG. 14 also illustrates an exemplary readout signal 144 that is generated by reading pattern 142 following the selective encoding of the individual surface variations in pattern 142. The readout signal 144 clearly differentiates the differently oriented perpendicular domains of the individual surface variations in pattern 142. The techniques described herein can enable use of a magnetic head with a write gap having a gap width less than 50% of the width of individual surface variations of pattern 142. Such resolution is highly desirable because it can improve the signal-to-noise ratio relative to encoding techniques that require larger gaps relative to the size of surface variations for conventional non-return to zero encoding methods.

Figure 15:
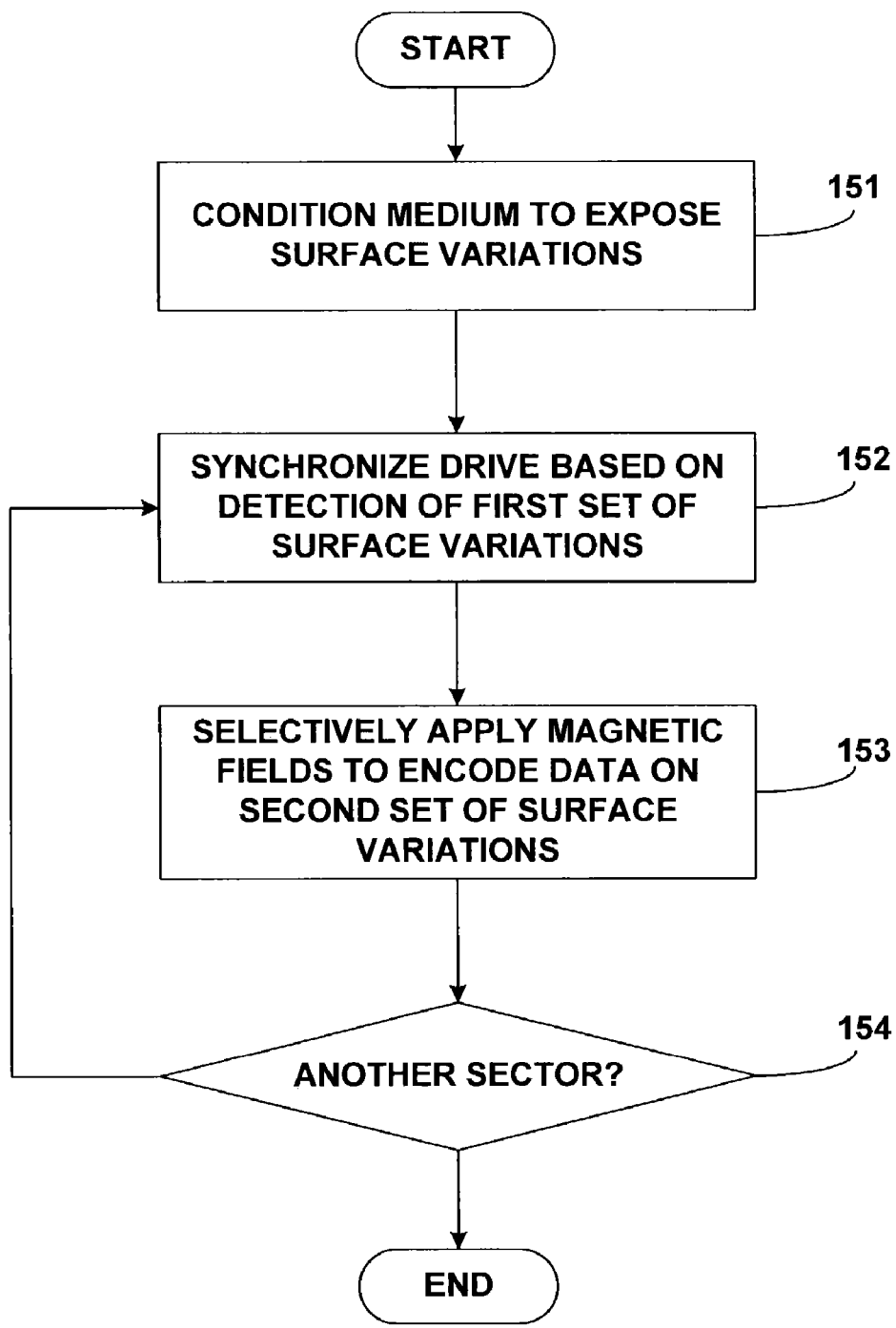
FIG. 15 is a flow diagram illustrating an encoding technique for patterned media according to an embodiment of the invention.

FIG. 15 is a flow diagram illustrating an encoding technique for patterned media according to an embodiment of the invention. As shown in FIG. 15, a patterned medium 10 is conditioned to magnetically expose surface variations 12, 13 relative to non-patterned areas 14 (151). A magnetic drive is then synchronized to medium 10 based on detection of a first set of surface variations 12 (152). The magnetic drive then selectively applies magnetic fields in order to encode data on a second set of surface variations 13 (153), such as illustrated in the timing diagram of FIG. 14. In the case of a disk shaped medium, each time another sector is encounter (154), the drive re-synchronizes based on detection of the first set of surface variations 12 (152), and encodes data on the second set of surface variations 13 (153).

Figure 16:
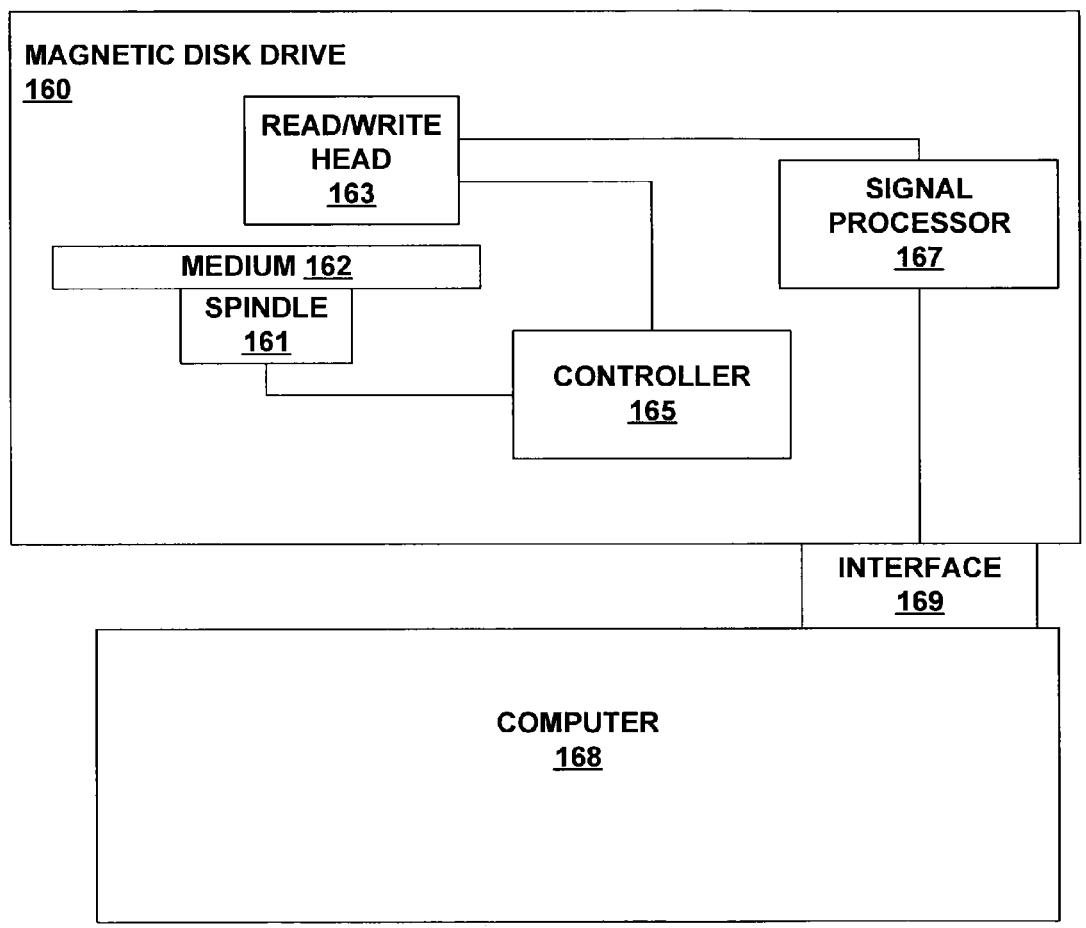
FIGS. 16 and 17 are block diagrams of exemplary magnetic drives that may be used to encode data on media described herein.
Figure 17:
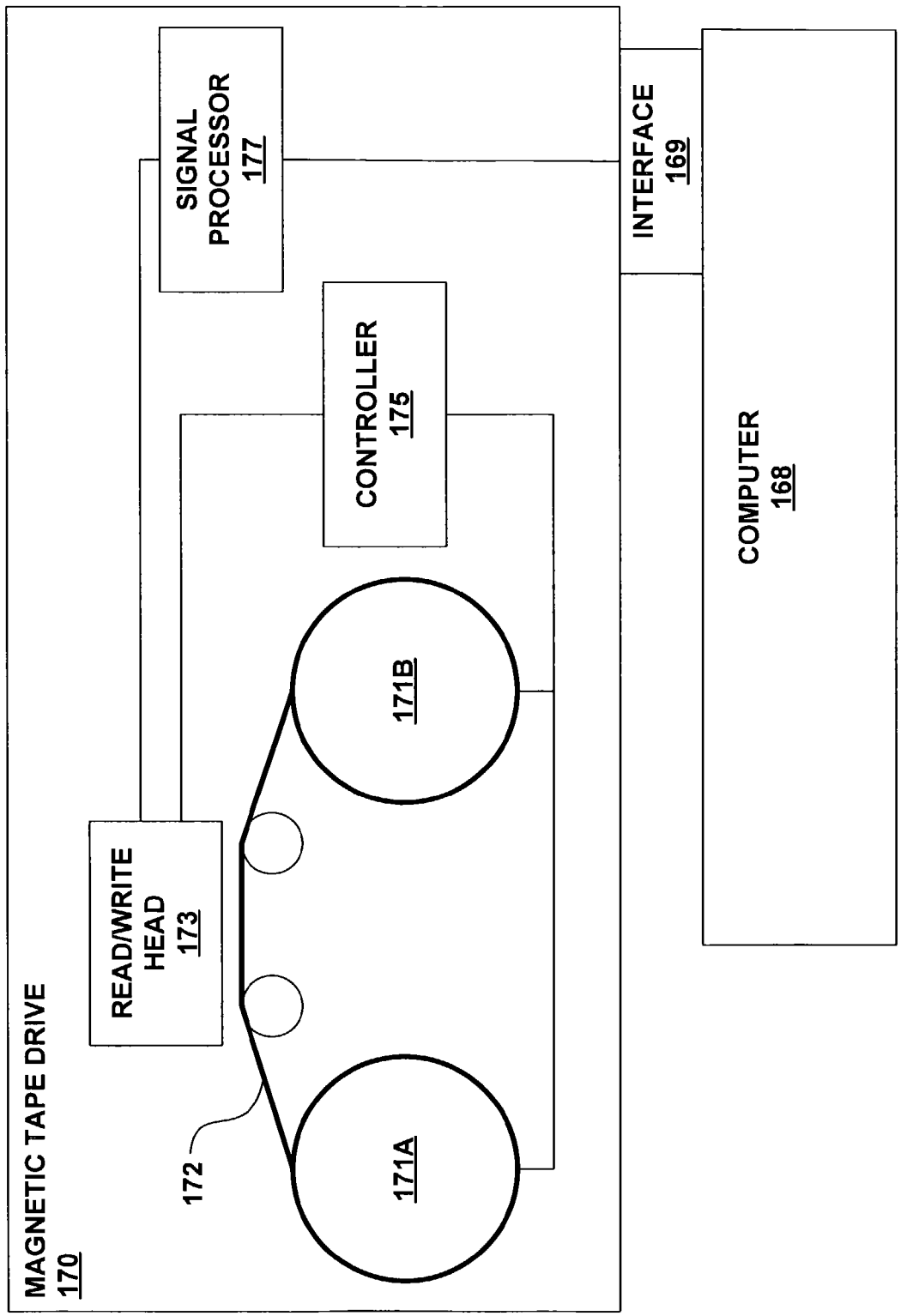

FIGS. 16 and 17 are block diagrams of exemplary magnetic storage drives that may be used to read or record data on media described herein. As shown in FIG. 16, magnetic storage drive 160 may be used with a disk shaped medium 162. In that case, magnetic storage drive 160 may comprise a magnetic disk drive, a hard disk drive, a floppy disk drive, or the like. Magnetic storage medium 162 includes features described herein, such as a first set of surface variations and a second set of surface variations. Medium 162 can be conditioned to magnetically expose the surface variations relative to areas between the respective surface variations. Detection of the surface variations in the first set can allow for synchronization of magnetic drive 160 to medium 162. Following such synchronization, magnetic drive 160 can selectively apply magnetic fields to a second set of surface variations of the medium 162 to encode data on medium 162.

Spindle 161 may be used to spin medium 162 and magnetic head 163 can be positioned relative to medium 162. A controller 165 controls spindle 161 and magnetic head 163 to precisely position read write head 163 relative to medium 162. A signal processor 167 interprets detected magnetic domains. In some cases, controller 165 causes magnetic head 163 to perform the conditioning and then selective encoding of medium 162 as described herein.

Magnetic storage device 160 may be coupled to a computer 168 via an interface 169. For example, computer 168 may comprise a central processing unit for any of a variety of computer devices, including, for example, a PC, a Macintosh, a computer workstation, a hand-held data terminal, a palm computer, a cell phone, digital paper, a digital television, a wireless device (in which case interface 169 may be wireless), a personal digital assistant, a laptop computer, a desktop computer, a digital camera, a digital recording device, or the like.

As shown in FIG. 17, magnetic storage drive 170 may be used with a medium 172 that includes magnetic tape. In that case, magnetic storage drive 170 may comprise a magnetic tape drive, a magnetic tape cartridge drive, or the like. Medium 172 may include magnetic tape spooled onto one or more spools 171A and 171B. Spools 171 may be housed in a cartridge, although the invention is not limited in that respect. Magnetic storage medium 172 in the form of magnetic tape includes features described herein, such as a first set of surface variations and a second set of surface variations. Medium 172 can be conditioned to magnetically expose the surface variations relative to areas between the respective surface variations. Detection of the surface variations in the first set can allow for synchronization of magnetic drive 170 to medium 172. Following such synchronization, magnetic drive 170 can selectively apply magnetic fields to a second set of surface variations of the medium 172 to encode data on medium 172. Moreover, the surface variations can be selectively magnetized, even if the surface variations define widths less than approximately 5.0 microns or less than approximately 1.0 micron.

Magnetic head 173 can be positioned to detect magnetic domains on medium 172. A controller 175 controls the positioning of magnetic head 173 as well as the movement of medium 172 such as by turning spools 173A and/or 173B to precisely position magnetic head 173 relative to medium 172. A signal processor 177 interprets detected magnetic domains. In some cases, controller 175 causes magnetic head 173 to perform the conditioning and selective encoding of medium 172 as described herein. Like in FIG. 16, magnetic storage device 170 of FIG. 17 may be coupled to a computer 168 via an interface 169.

The invention may be capable of providing a number of advantages. In particular, perpendicular magnetic media according to the invention may achieve higher storage densities than conventional longitudinal media. The use of a magnetic recording layer exhibiting perpendicular magnetic anisotropy is a feature that enables effective conditioning and selective encoding to occur, as described herein, specifically when the widths of surface variations are less than approximately 5.0 microns, and more specifically less than approximately 1.0 micron. At these sizes, the conditioning and encoding techniques may be less effective, or possibly ineffective, when longitudinal recording layers are used. Accordingly, the use of a recording layer exhibiting perpendicular magnetic anisotropy is a useful feature to facilitate conditioning and encoding, as described herein, specifically when the media has surface variations of widths less than approximately 5.0 microns, and more specifically less than approximately 1.0 micron.

The encoding techniques described herein may also improve signal to noise ratios relative to conventional non-return-to-zero (NRZ) encoding techniques applied to patterned media, and can allow for high resolution write gaps less than 50% of the width of the surface variations to be used. These and other embodiments are within the scope of the following claims.

The invention claimed is:

1. A method comprising:
synchronizing a magnetic drive to a patterned magnetic medium based on detection of a set of first surface variations in the patterned magnetic medium; and
selectively applying magnetic fields to a second set of surface variations of the patterned magnetic medium to encode data on the patterned magnetic medium, wherein a timing of the selective application of the magnetic fields is defined by the synchronization of the magnetic drive to the patterned magnetic medium, wherein the first and second sets of surface variations comprise first and second protrusions respectively, and selectively applying magnetic fields to the second set of surface variations comprises applying magnetic fields to the second protrusions and not applying magnetic fields to areas between the second protrusions.

2. A method comprising:
synchronizing a magnetic drive to a patterned magnetic medium based on detection of a set of first surface variations in the patterned magnetic medium; and
selectively applying magnetic fields to a second set of surface variations of the patterned magnetic medium to encode data on the patterned magnetic medium, wherein a timing of the selective application of the magnetic fields is defined by the synchronization of the magnetic drive to the patterned magnetic medium;
the method further comprising conditioning the magnetic medium prior to synchronizing the magnetic drive to magnetically expose the first and second sets of surface variations relative to areas between the surface variations in the first set and areas between the surface variations in the second set.

3. A method comprising:
synchronizing a magnetic drive to a patterned magnetic medium based on detection of a set of first surface variations in the patterned magnetic medium; and
selectively applying magnetic fields to a second set of surface variations of the patterned magnetic medium to encode data on the patterned magnetic medium, wherein a timing of the selective application of the magnetic fields is defined by the synchronization of the magnetic drive to the patterned magnetic medium, wherein the patterned magnetic medium exhibits perpendicular magnetic anisotropy, and at least some of the surface variations in the first and second sets define widths of less than approximately 5.0 microns.

4. The method of claim 3, wherein at least some of the surface variations in the first and second sets define widths of less than approximately 1.0 micron.

5. A method comprising:
synchronizing a magnetic drive to a patterned magnetic medium based on detection of a set of first surface variations in the patterned magnetic medium;
selectively applying magnetic fields to a second set of surface variations of the patterned magnetic medium to encode data on the patterned magnetic medium, wherein a timing of the selective application of the magnetic fields is defined by the synchronization of the magnetic drive to the patterned magnetic medium; and
magnetically detecting the set of first surface variations relative to areas between the surface variations in the first set.

6. A method comprising:
synchronizing a magnetic drive to a patterned magnetic medium based on detection of a set of first surface variations in the patterned magnetic medium; and
selectively applying magnetic fields to a second set of surface variations of the patterned magnetic medium to encode data on the patterned magnetic medium, wherein a timing of the selective application of the magnetic fields is defined by the synchronization of the magnetic drive to the patterned magnetic medium, wherein synchronizing the magnetic drive includes identifying a variable frequency oscillator (VFO) signal in the set of first surface variations.

7. A system comprising:
a patterned magnetic recording medium including a substrate, and a magnetic recording layer formed over the substrate, the magnetic recording layer including a first set of surface variations and a second set of surface variations; and
a magnetic drive that synchronizes to the patterned magnetic medium based on detection of the set of first surface variations, and selectively applies magnetic fields to the second set of surface variations to encode data on the patterned magnetic medium, wherein a timing of the selective application of the magnetic fields is defined by the synchronization of the magnetic drive to the patterned magnetic medium, wherein the magnetic head includes a magnetic head positiond relative to the patterned magnetic recording medium and a controller to control application of magnetic fields by the magnetic head, and wherein the magnetic head defines a gap less than approximately 50% of a width associated with the surface variations in the second set.

8. A system comprising:
a patterned magnetic recording medium including a substrate, and a magnetic recording layer formed over the substrate, the magnetic recording layer including a first set of surface variations and a second set of surface variations; and
a magnetic drive that synchronizes to the patterned magnetic medium based on detection of the set of first surface variations, and selectively applies magnetic fields to the second set of surface variations to encode data on the patterned magnetic medium, wherein a timing of the selective application of the magnetic fields is defined by the synchronization of the magnetic drive to the patterned magnetic medium, wherein the first and second sets of surface variations comprise first and second protrusions respectively, and the magnetic drive selectively applies magnetic fields to the second set of surface variations by applying magnetic fields to the second protrusions and not applying magnetic fields to areas between the second protrusions.

9. A system comprising:
a patterned magnetic recording medium including a substrate, and a magnetic recording layer formed over the substrate, the magnetic recording layer including a first set of surface variations and a second set of surface variations; and
a magnetic drive that synchronizes to the patterned magnetic medium based on detection of the set of first surface variations, and selectively applies magnetic fields to the second set of surface variations to encode data on the patterned magnetic medium, wherein a timing of the selective application of the magnetic fields is defined by the synchronization of the magnetic drive to the patterned magnetic medium, wherein the patterned magnetic recording medium exhibits perpendicular magnetic anisotropy and at least some of the surface variations in the first and second sets define widths of less than approximately 5.0 microns.

* * * * *